US 6,527,023 B1

(12) United States Patent
Takahashi

(10) Patent No.: US 6,527,023 B1
(45) Date of Patent: Mar. 4, 2003

(54) PNEUMATIC RADIAL TIRE INCLUDING SIPES

(75) Inventor: Toshihiko Takahashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 7 days.

(21) Appl. No.: 09/696,996

(22) Filed: Oct. 26, 2000

(30) Foreign Application Priority Data

Mar. 13, 2000 (JP) .......................................... 2000-068858

(51) Int. Cl.[7] .......................... B60C 11/11; B60C 11/12; B60C 11/13; B60C 101/00; B60C 107/00
(52) U.S. Cl. ............................ 152/209.18; 152/209.22; 152/902; 152/DIG. 3
(58) Field of Search ................. 152/209.18, 209.22, 152/DIG. 3, 902, 209.15

(56) References Cited

U.S. PATENT DOCUMENTS 5,256,221 A  *  10/1993  Trabandt

FOREIGN PATENT DOCUMENTS

| JP | 62-268709 | * | 11/1987 |
| JP | 63-306904 | * | 12/1988 |
| JP | 64-16406 |  | 1/1989 |
| JP | 1-215604 |  | 8/1989 |
| JP | 2-200503 | * | 8/1990 |
| JP | 9-188110 |  | 7/1997 |
| JP | 9-202115 |  | 8/1997 |
| JP | 10-95209 |  | 4/1998 |

* cited by examiner

Primary Examiner—Steven D. Maki
(74) Attorney, Agent, or Firm—Merchant & Gould, P.C.

(57) ABSTRACT

In a pneumatic radial tire having blocks 4 formed on its tread 1 by transverse grooves 3 extending along its width and main grooves 2 extending circumferentially across the transverse grooves 3, every two blocks 41C and 41M spaced apart from each other transversely by one of the main grooves 2 have a sipe 81CM which extends transversely from one block 41C to the other 41M across the main groove 2 and is open in the tread surfaces and the said main groove throughout its length. The sipe 81CM has along its length and depth a cross section 810 defined by an inner portion 810a and 810b made in each block 41C or 41M, a substantially U-shaped portion 810c made in the bottom and side walls 21, 22 and 23 of the main groove 2, and a portion 810d or 810e made in each block for connecting the inner and substantially U-shaped portions 810a and 810b, the connecting portion having a depth reduced by a shelf 9a or 9b formed on each block. The main grooves 2 have a depth which is smaller than that of the transverse grooves 3, but which is equal to that of the transverse grooves 3 where they cross the transverse grooves 3. It is useful even as an all-season tire for a heavy sport utility vehicle (SUV) without causing any reduction of steering stability on a dry road, or any toe-and-heel, or other uneven wear, while showing an improved traction on a snow-covered road and an improved resistance to wandering on a rainy road, throughout its life.

2 Claims, 7 Drawing Sheets

PNEUMATIC RADIAL TIRE INCLUDING SIPES

BACKGROUND OF THE INVENTION

1. Field of the Invention

This invention relates to an all-season pneumatic radial tire which can maintain steering stability and resistance to uneven wear on a dry road, a high performance of traction on a snow-covered road, and an improved resistance to wandering on a rainy road, throughout the whole period from the beginning to the end of its use.

2. Description of the Related Art

The provision of a light truck, particularly a sport utility vehicle (SUV) having a large body weight, has recently brought about a demand for the provision of all-season pneumatic tires having a high block rigidity as required for withstanding the weight of the vehicle body, and yet showing an excellent performance on a snow-covered road.

There is known a pneumatic radial tire having blocks defined by a plurality of circumferentially extending main grooves and a multiplicity of transverse grooves spaced apart from one another along the circumference of the tire. This type of tire usually has sipes formed in the blocks and extending along its width for achieving an improved traction on a snow-covered road, an improved resistance to wandering on a rainy road, a reduction of pattern noise made by the tread contacting the ground and an improved riding comfort.

There have been proposed various forms of sipes, and they can be classified mainly into OA and OB types by their cross sectional shape along their depth.

Examples of OA type sipes are shown at 801 and 802 in FIGS. 4 and 5. The sipes 801 and 802 made in two adjoining blocks 401 and 402, respectively, which are separated from each other by a circumferentially extending main groove 201, have portions 801a and 802a opening in the main groove 201 for connecting the sipes therewith, and having a horizontally straight cross section with a small depth above shelves 901a and 902a formed on the blocks 401 and 402. The sipes 801 and 802 have inwardly of the connecting portions 801a and 802a inner portions 801b and 802b cut with a greater depth and having a substantially semi-circular, or rectangular cross section. Tires having OA type sipes formed in the blocks are used mainly in summer, or throughout the year. FIG. 4 also shows a tread 101, circumferentially extending grooves 701 having a smaller open width than the main grooves 201, and transverse grooves 301. It also shows shoulder ends 501 and 502, and a tire centerline TC. It also shows by an arrow R the direction in which the circumference of the tire extends.

Examples of OB type sipes are shown in FIGS. 7($a_0$) and 7($b_0$), which correspond to FIGS. 4 and 5, respectively, and show a tire having the same tread pattern as shown in FIG. 4, but a different form of sipes. The sipes 811 and 812 are formed in two adjoining blocks 411 and 412, respectively, which are separated from each other by a circumferentially extending main groove 211. Neither of the blocks 411 and 412, however, has any shelf as shown at 901a or 902a in FIG. 5, and each sipe 811 or 812, therefore, does not have any connecting portion of reduced width as shown at 801a or 802a in FIG. 5, but is cut with a substantially equal depth from its end 811a or 812a opening in the main groove 211 through its inner portion 811b or 812b and has a rectangular cross section substantially like a parallelogram. Tires having OB type sipes formed in the blocks are used mainly in winter. FIG. 7($a_0$) also shows transverse grooves 311. It also shows by an arrow R the direction in which the circumference of the tire extends.

When a tire having OA type sipes is new, or in the beginning stage of its wear as shown in FIGS. 6($a_0$) and 6($b_0$), the sipes 801 and 802 having the cross sectional shapes as described make it possible to achieve steering stability and resistance to uneven wear on a dry road, a good performance of traction on a snow-covered road and resistance to wandering on a rainy road. As the wear of its tread surface proceeds, however, the connecting portions 801a and 802a of the sipes 801 and 802 have a reduced depth, and the shelves 901a and 902a are finally exposed on the tread surface with the loss of the sipes 801 and 802 as shown in FIG. 6($b_1$), resulting in an increase in rigidity of the blocks along the main groove 201 and a lowering of the traction on a snow-covered road and the resistance to wandering on a rainy road. Therefore, this type of tire is not necessarily satisfactory for use throughout the year, though it may be suitable in summer. FIGS. 6($a_0$) and 6($a_1$) show by an arrow R the direction in which the circumference of the tire extends.

On the other hand, a tire having OB type sipes 811 and 812 exhibits an improved traction on a snow-covered road, since the sipes 811 and 812 having the cross sectional shapes as described lower the rigidity of the blocks 411 and 412, but the lower rigidity of the blocks also brings about a lowering of steering stability on a dry road and the uneven wear, such as toe-and-heel wear, of the blocks 411 and 412 along their edges. Therefore, a tire having OB type sipes is not necessarily preferable for use throughout the year, though it may be suitable in winter. Moreover, it is too low in block rigidity for a tire used on a light truck, and particularly on a sport utility vehicle (SUV) having a large body weight. Therefore, the improvement in the block rigidity is required.

SUMMARY OF THE INVENTION

This invention has adopted a pneumatic radial tire having blocks formed on its tread by transverse grooves extending along its width and main grooves extending circumferentially across the transverse grooves, wherein every two of the blocks that are transversely spaced apart from each other by one of the main grooves have a sipe which extends transversely from one block to the other across the main groove and is open in the surface of the tread and the main groove throughout its length, the sipe having along its length and depth a cross section defined by an inner portion made in each block, a substantially U-shaped portion made in the bottom and side walls of the main groove, and a portion made in each block for connecting the inner and substantially U-shaped portions, the connecting portion having a depth reduced by a shelf formed on each block, the main grooves having a depth which is smaller than that of the transverse grooves, but which is equal to that of the transverse grooves where they cross the transverse grooves.

The tire of this invention, as described, differs from any known OA type tire mentioned in that its sipes have substantially U-shaped portions extending across the main grooves and remaining open therein for preventing any undesirable increase in rigidity of the blocks along the main grooves, even after the tire has got considerably worn, while the sipes always remain effective in forming edges on a snow-covered road. Thus, the tire of this invention exhibits an improved traction on a snow-covered road and an improved resistance to wandering on a rainy road over any known OA type tire mentioned.

The tire of this invention has a block rigidity which is not so low as that of any known OB type tire mentioned, but is comparable to that of any known OA type tire, since each of the blocks between which a sipe extends across a main groove has a shelf formed below the sipe portion of reduced depth connecting its inner and substantially U-shaped portions. Although the sipes extending between the adjoining blocks across the main grooves may lower the rigidity of the blocks along the main grooves, the circumferentially extending main grooves, which are smaller in depth than the transvserse grooves, except where the former cross the latter, make it possible to prevent any undesirably great lowering of block rigidity, while also restraining any unnecessary movement of the tire around its circumference. Thus, the tire of this invention maintains a satisfactorily high steering stability on a dry road, and resists any uneven toe-and-heel wear.

Therefore, the tire of this invention can effectively be used as even an all-season tire for a sport utility vehicle (SUV) having a large body weight without causing any reduction of steering stability on a dry road, or any toe-and-heel, or other uneven wear, while showing an improved traction on a snow-covered road and an improved resistance to wandering on a rainy road, from the beginning to end of its use.

It is, therefore, an object of this invention to provide an all-season pneumatic radial tire which exhibits an improved traction on a snow-covered road and an improved resistance to wandering on a rainy road, while not showing any undesirable reduction of steering stability on a dry road, or any uneven wear, from the beginning to the end of its use.

BRIEF DESCRIPTION OF THE DRAWINGS

FIG. 3($b_0$) is an enlarged schematic sectional view taken along the line $A_1-A_2$ of FIG. 3($a_0$);

FIG. 3($a_1$) is a view similar to FIG. 3($a_0$), but showing the shape of the sipe as observed when the tire is in the final stage of its wear;

FIG. 3($b_1$) is an enlarged schematic sectional view taken along the line $A_1-A_2$ of FIG. 3($a_1$);

FIG. 6($b_0$) is an enlarged schematic sectional view taken along the line $B_1-B_2$ of FIG. 6($a_0$);

FIG. 6($a_1$) is a view similar to FIG. 6($a_0$), but showing the shape of the sipe as observed when the tire is in the final stage of its wear;

FIG. 6($b_1$) is an enlarged schematic sectional view taken along the line $B_1-B_2$ of FIG. 6($a_1$);

FIG. 7($b_0$) is an enlarged schematic sectional view taken along the line $B_1-B_2$ of FIG. 7($a_0$).

PREFERRED MODE OF CARRYING OUT THE INVENTION

Figure 1:
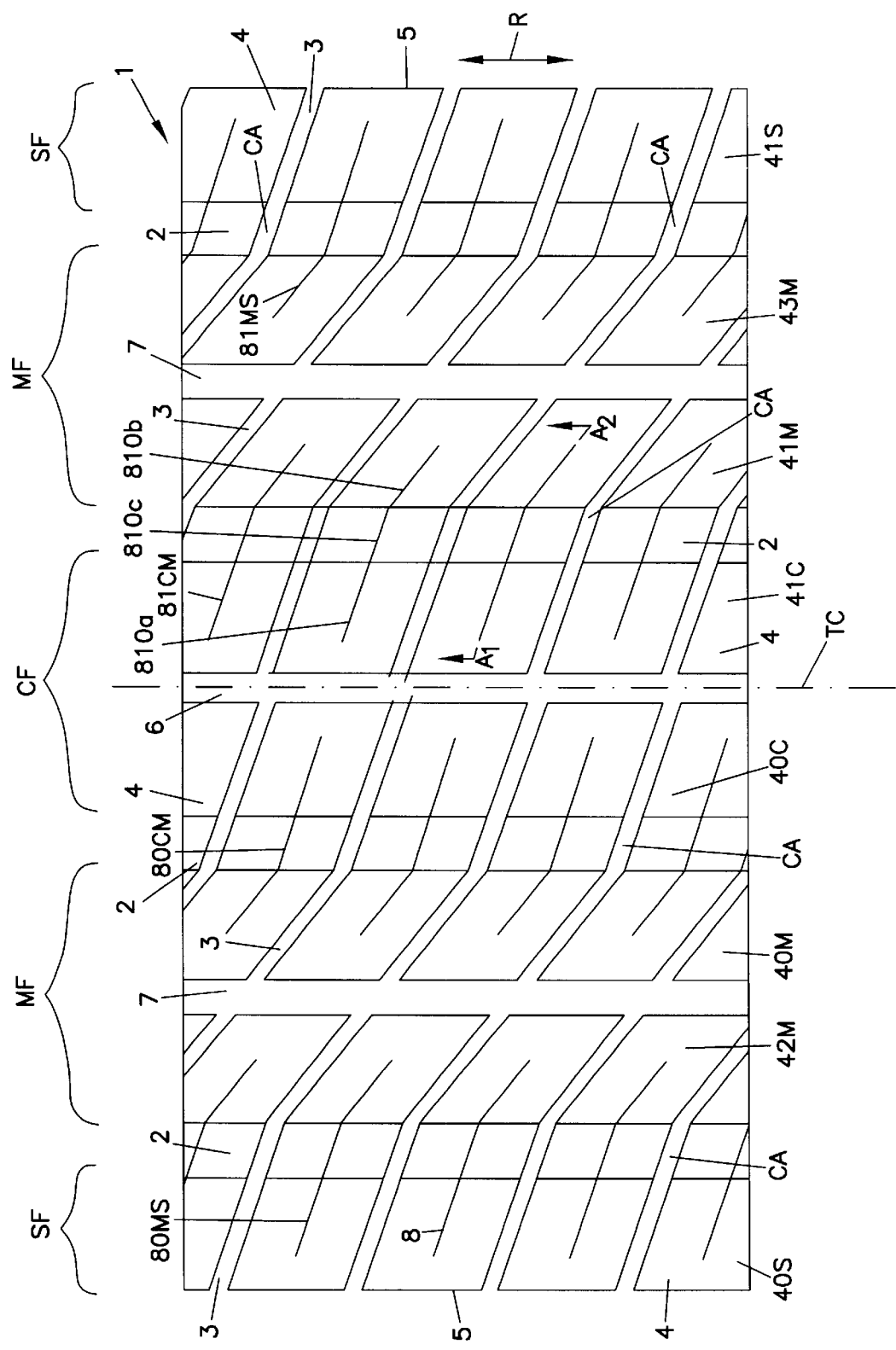
FIG. 1 is a schematic developed view of a part of the tread of a pneumatic radial tire embodying this invention.

Description will now be made of a preferred mode of carrying out this invention with reference to the drawings. FIG. 1 shows the tread of a pneumatic radial tire embodying this invention schematically in a developed form. The tire has a plurality of blocks 4 formed on its tread 1 by a plurality of main grooves 2 extending circumferentially of the tire and a plurality of transverse grooves 3 extending along its width. The main grooves 2 have a depth which is basically smaller than that of the transverse grooves 3, but is equal thereto in the crossing areas CA where the grooves 2 cross the grooves 3. R indicates the direction in which the circumference of the tire extends.

The transverse grooves 3 extend substantially from the tire centerline TC to a pair of shoulders 5 at an angle thereto. A groove 6 extends circumferentially along the tire centerline TC and has a depth equal to that of the transverse grooves 3, and a width which is smaller than that of the main grooves 2. This invention is, however, not limited to a tire having a tread pattern featured by transverse grooves extending at an angle as described, but is equally applicable to a tire having a tread pattern featured by transverse grooves extending at right angles to the tire centerline.

The tread 1 has a central region CF formed by a plurality of central blocks 40C and a plurality of central blocks 41C which lie along the tire centerline TC and on the opposite side of the tire centerline TC from each other, as shown in FIG. 1. The tread 1 also has two mediate regions MF located on the opposite side of the central region CF from each other. Each mediate region MF is formed by a plurality of mediate blocks 40M or 41M formed on the opposite side of a circumferentially extending main groove 2 from the central blocks 40C or 41C, and a plurality of mediate blocks 42M or 43M formed on the opposite side of a circumferentially extending groove 7 from the mediate blocks 40M or 41M. Each groove 7 has a width and a depth which are equal to those of the groove 6. The tread 1 further has two shoulder regions SF each formed by a plurality of shoulder blocks 40S or 41S on the opposite side of a circumferentially extending main groove 2 from the mediate blocks 42M or 43M.

A transverse sipe 8 extends between every two blocks 4 adjoining each other transversely of the tire and across the main groove 2 therebetween. For example, every central block 40C and the mediate block 40M adjoining it and located on the opposite side of a main groove 2 therefrom have a transverse sipe 80CM extending therebetween across the main groove 2. Every central block 41C and the mediate block 41M adjoining it and located on the opposite side of another main groove 2 therefrom likewise have a transverse sipe 81CM extending therebetween across the main groove 2. Every pair of mediate and shoulder blocks 42M and 40S adjoining each other likewise have a sipe 80MS extending across a main groove 2. Likewise, every pair of mediate and shoulder blocks 43M and 41S adjoining each other have a sipe 81MS extending across a main groove 2.

Figure 2:
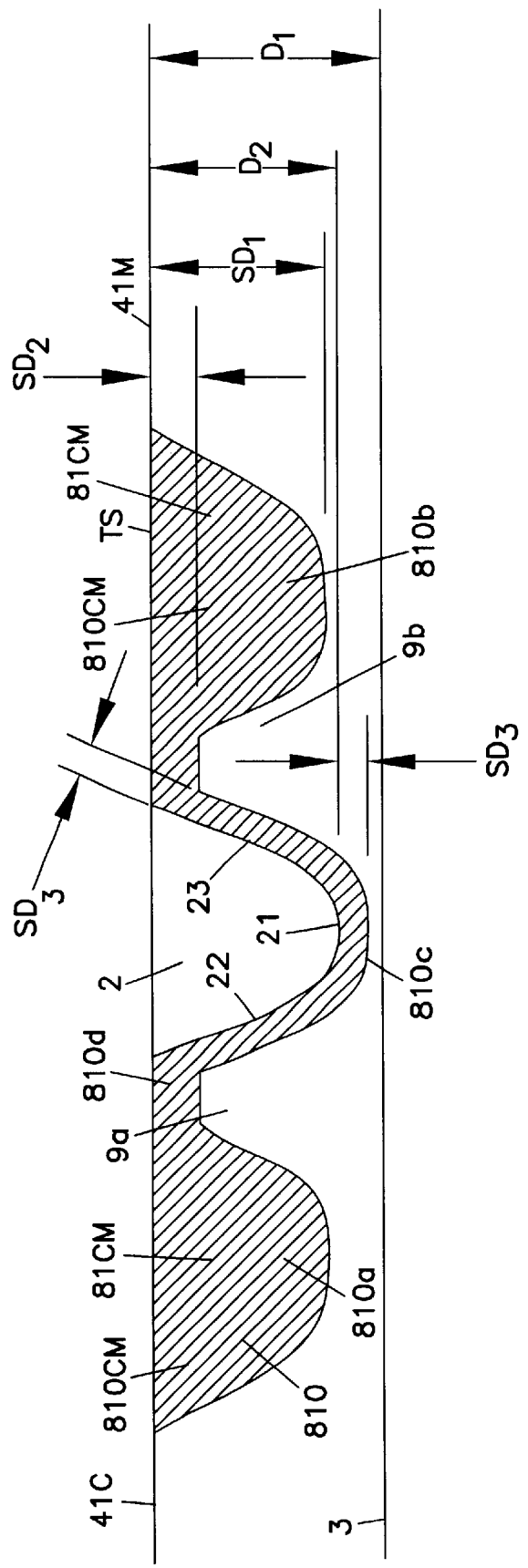
FIG. 2 is an enlarged schematic sectional view of a transverse sipe taken along the line $A_1-A_2$ of FIG. 1.

FIG. 2 shows an enlarged schematic cross section of one of the sipes taken along the line $A_1-A_2$ of FIG. 1. It shows the cross section of the sipe 81CM along its length and depth with a central block 41C and a mediate block 41M. The sipe 81CM has a pair of ends closed in the blocks 41C and 41M, respectively, and is open throughout its length in the tread surface TS (or block surfaces) and the main groove 2, as shown in FIGS. 1 and 2.

The sipe 81CM has a hollow 810CM formed by two inner portions 810a and 810b cut in the blocks, a substantially U-shaped portion 810c cut in the bottom 21 and side walls 22 and 23 of the main groove 2, and two portions 810d and 810e connecting the substantially U-shaped portion 810c with the inner portions 810a and 810b, respectively, and each having a width reduced by a shelf 9a or 9b, as is obvious from its cross section 810 shown in FIG. 2 along its length and depth.

The foregoing description of the sipe 81CM is equally applicable to any other sipe shown in FIG. 1, i.e. every sipe 80CM extending between central and mediate blocks 40C and 40M through the main groove 2 therebetween, every sipe 80MS extending between mediate and shoulder blocks 42M and 40S through the main groove 2 therebetween, and every sipe 81MS extending between mediate and shoulder blocks 43M and 41S through the main groove 2 therebetween.

The sipes of the tire embodying this invention as described above are shaped in top plan as shown in FIG. 3($a_0$) and in cross section as shown in FIG. 3($b_0$) when the tire is new, or in the beginning stage of its wear, but the progress of its wear changes their shapes in top plan and cross section as shown in FIGS. 3($a_1$) and 3($b_1$), respectively.

Figure 3:
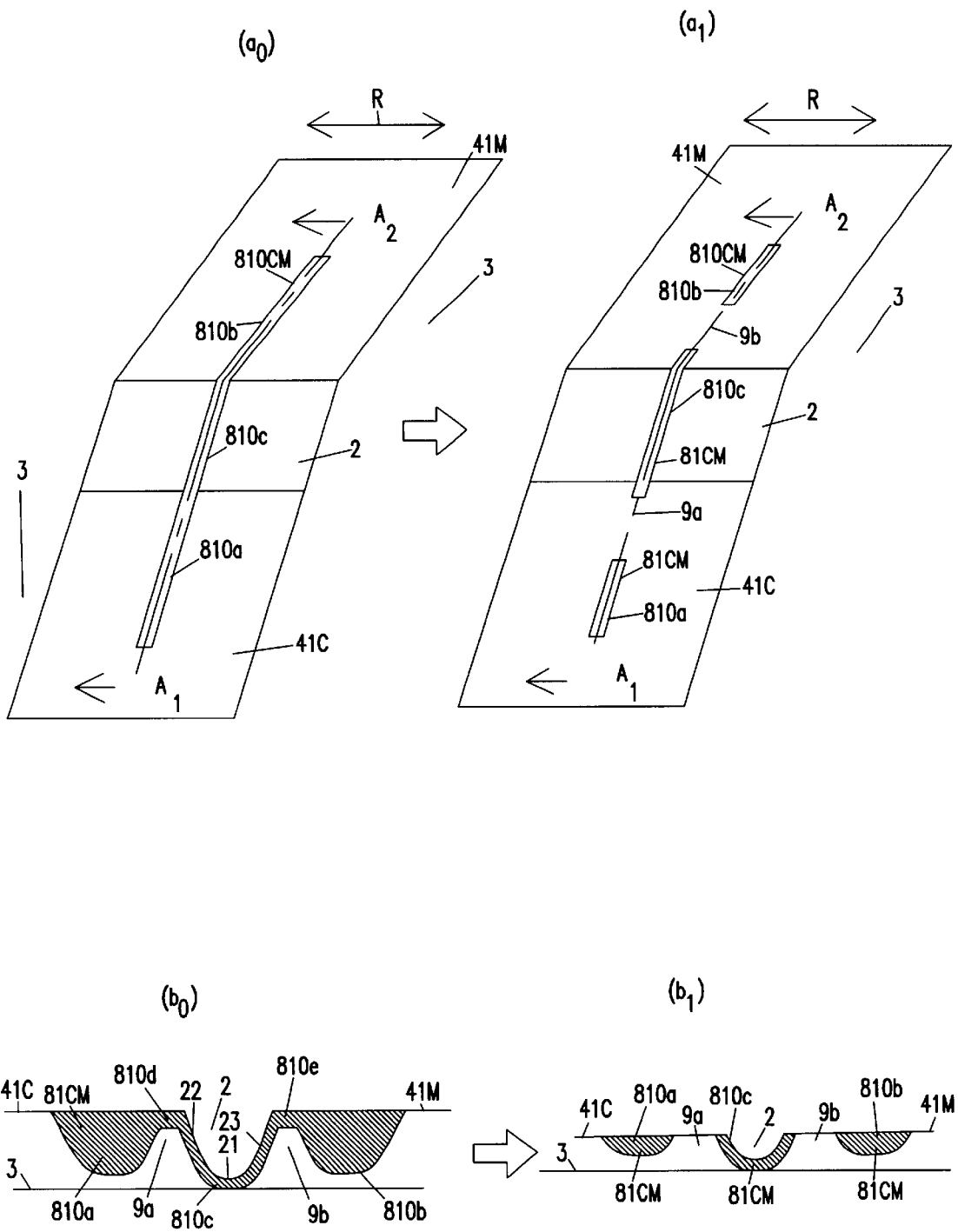
FIG. 3($a_0$) is a schematic top plan view of a part of the tread showing the shape of a transverse sipe as observed when the tire is new, or in the beginning stage of its wear.

The transverse sipe 81CM formed along the walls 22,23 of each block from the bottom 21 of the circumferentially extending main groove 2 always has its substantially U-shaped portion 810c open in the main groove 2 irrespective of the wear of the tire, as shown in FIGS. 3($a_0$) to 3($b_1$). Therefore, the tire according to this invention does not have any undesirable increase in rigidity of the blocks along their edges along the main groove 2. Moreover, the substantially U-shaped portion 810c of the sipe 81CM remains open in the tread surface and main groove 2 even after the wear of the tread, as shown in FIGS. 3($a_1$) and 3($b_1$). Therefore, the sipes always remain effective in forming edges to ensure an improved traction on a snow-covered road and an improved resistance to wandering on a rainy road.

Figure 7:
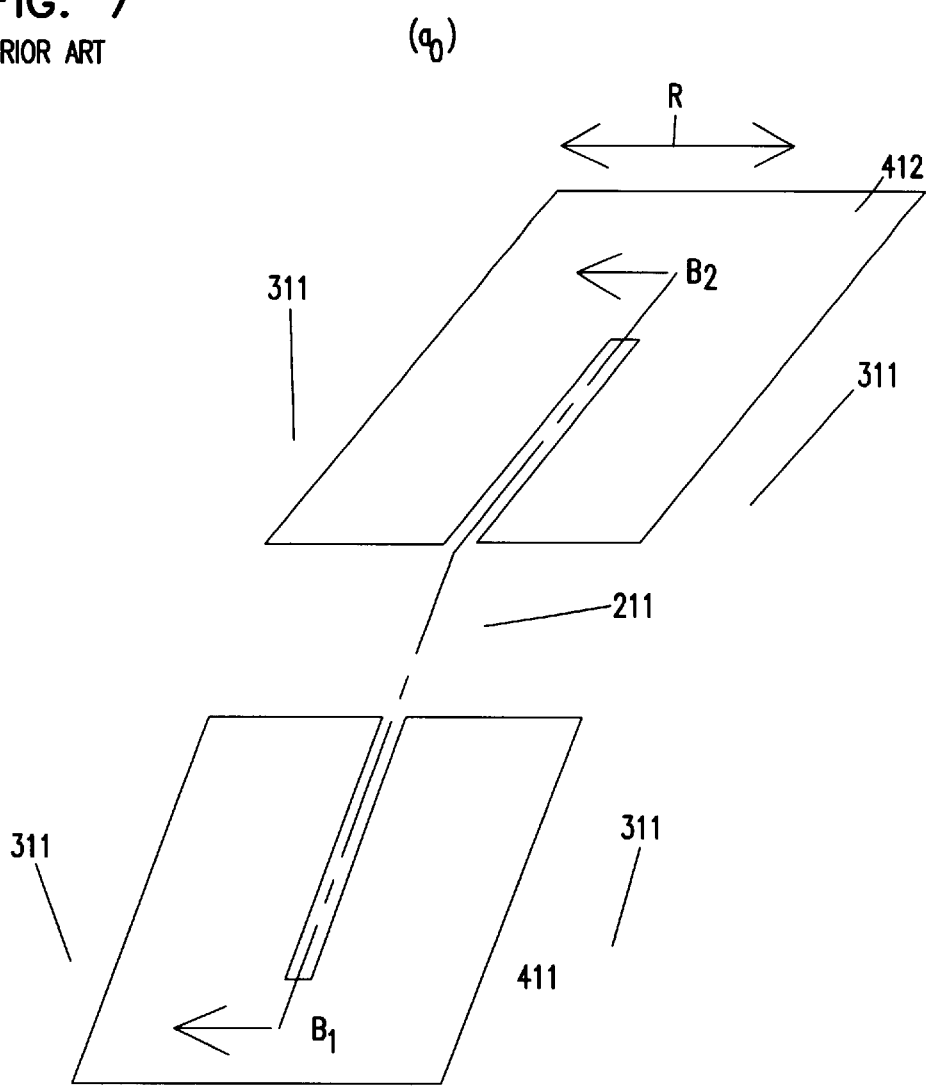
FIG. 7($a_0$) is a view similar to FIG. 6($a_0$), but showing an OB type sipe.

The connecting portions 810d and 810e of the sipe 81CM are so formed as to leave the shelves 9a and 9b on the blocks 41C and 41M. The shelves 9a and 9b restrain any undesirable lowering in rigidity of the blocks along the main groove 2 that may be caused by the structure not having any such shelf, as shown in FIG. 7($b_0$).

The main grooves 2 extending circumferentially of the tire according to this invention have a depth which is smaller than that of the transverse grooves 3, except in their crossing areas CA where the grooves 2 and 3 have an equal depth. This arrangement makes it possible to restrain any undesirable lowering in rigidity of the blocks along their edges close to the main grooves 2, while also preventing any unnecessary movement of the tire around its circumference. Thus, it is possible to prevent any undesirable lowering in steering stability on a dry road, as well as any uneven toe-and-heel wear. FIGS. 3($a_0$) and 3($a_1$) show by an arrow R the direction in which the circumference of the tire extends.

The tire according to this invention is preferably so designed as to satisfy the following relationships (see FIG. 2):

$$D_1 - 1.6 \text{ mm} \leq D_2$$

where $D_1$ is the depth of the transverse groove 3 and $D_2$ is the depth of the main groove 2; and $$0.1 \times SD_1 \leq SD_2 \leq 0.5 \times SD_1$$

$$0.1 \times SD_1 \leq SD_3 \leq 0.3 \times SD_1$$

where $SD_1$ is the maximum depth of the inner portions 810a and 810b of the sipe 81CM, $SD_2$ is the depth of its connecting portions 810d and 810e, and $SD_3$ is the depth of its substantially U-shaped portion 810c.

If the depth $D_2$ of the main groove 2 is equal to, or larger than the depth $D_1$ of the transverse groove 3, the blocks have an undesirably lower rigidity along their edges close to the main groove 2, and a lowering of steering stability on a dry road and uneven toe-and-heel wear are very likely to occur. The depth $D_2$ of the main groove 2 which is smaller than ($D_1$−1.6 mm) is also undesirable, since it is smaller than the depth marked by a tread wear indicator (TWI).

The depth $SD_2$ of the connecting portions 810d and 810e exceeding ($0.5 \times SD_1$) is too large for any satisfactory block rigidity of a tire having a transverse sipe extending between every two adjoining blocks across a main groove, and a lowering of steering stability on a dry road and uneven toe-and-heel wear are very likely to occur. The depth $SD_2$ which is smaller than ($0.1 \times SD_1$) is so small that the blocks may have an undesirably high rigidity along the main groove 2, making it difficult to achieve any satisfactory improvement in traction on a snow-covered road and resistance to wandering on a rainy road.

The depth $SD_3$ of the substantially U-shaped portion 810c exceeding ($0.3 \times SD_1$) is too large for avoiding any undesirable lowering of block rigidity, and thereby any undesirable lowering of steering stability on a dry road or any uneven toe-and-heel wear, even though the main groove 2 may have a depth which is smaller than that of the transverse groove 3 except in their crossing area CA where they have an equal depth. The depth $SD_3$ which is smaller than ($0.1 \times SD_1$) is too small for achieving any satisfactory lowering of block rigidity along the main groove 2 and thereby any satisfactory improvement in traction on a snow-covered road, or resistance to wandering on a rainy road.

The preferred ranges of numerical limitations as stated above are equally applicable to any other sipe in any other block, or any other circumferentially or transversely extending groove, but are not intended for limiting the scope of this invention. For example, the structural features of this invention may be applied to only a specific row or rows of blocks, or only a part of blocks. This invention is not limited to a tire having the tread pattern described above, but is also applicable to any tire having a different tread pattern. According to the tire embodying this invention as described, the blocks are defined by the main and other grooves extending circumferentially of the tire and the transverse grooves (extending at an angle thereto). Although each block has been described as having only one transverse sipe, it may alternatively have a plurality of sipes. Although it may be possible to form an ordinary sipe in each block with a transverse sipe as described, it is desirable to form only a transverse sipe as described to ensure that the advantages of this invention be manifested effectively. Although the sipes have been shown as being straight, they can be replaced by zigzag sipes, or combined straight and zigzag sipes. The combined sipes may include a sipe having zigzag inner portions and straight connecting and substantially U-shaped connecting portions, and a sipe having a zigzag bottom in its substantially U-shaped portion.

EXAMPLES

Tires each sized as P235/75R15 and having the tread pattern shown in FIG. 1 were prepared as tires embodying this invention as Example 1. Each tire had a transverse sipe width of 0.8 mm, a transverse groove depth $D_1$ of 10.1 mm and a main groove depth $D_2$ of 8.5 mm, and each of its sipes had a maximum depth $SD_1$ of 8.5 mm in its inner portions, a depth $SD_2$ of $0.3 \times SD_1$ in its connecting portions and a depth $SD_3$ of $0.1 \times SD_1$ in its substantially U-shaped portion.

The tires were put on the four wheels, respectively, of a light truck (or sport utility vehicle) sold under the tradename "Terrano Reglas", and the vehicle carrying four people was driven for the evaluation of the tires as to steering stability on a dry road, a traction on a snow-covered road and resistance to wandering on a rainy road when they were new, and also when they were so worn as to lose a half of the main groove depth. Evaluation as to uneven wear was made after a running distance of 9,600 km had been covered. The tires had been mounted on 15×6.5-JJ rims, and were evaluated at a pneumatic pressure of 240 kPa.

Figure 4:
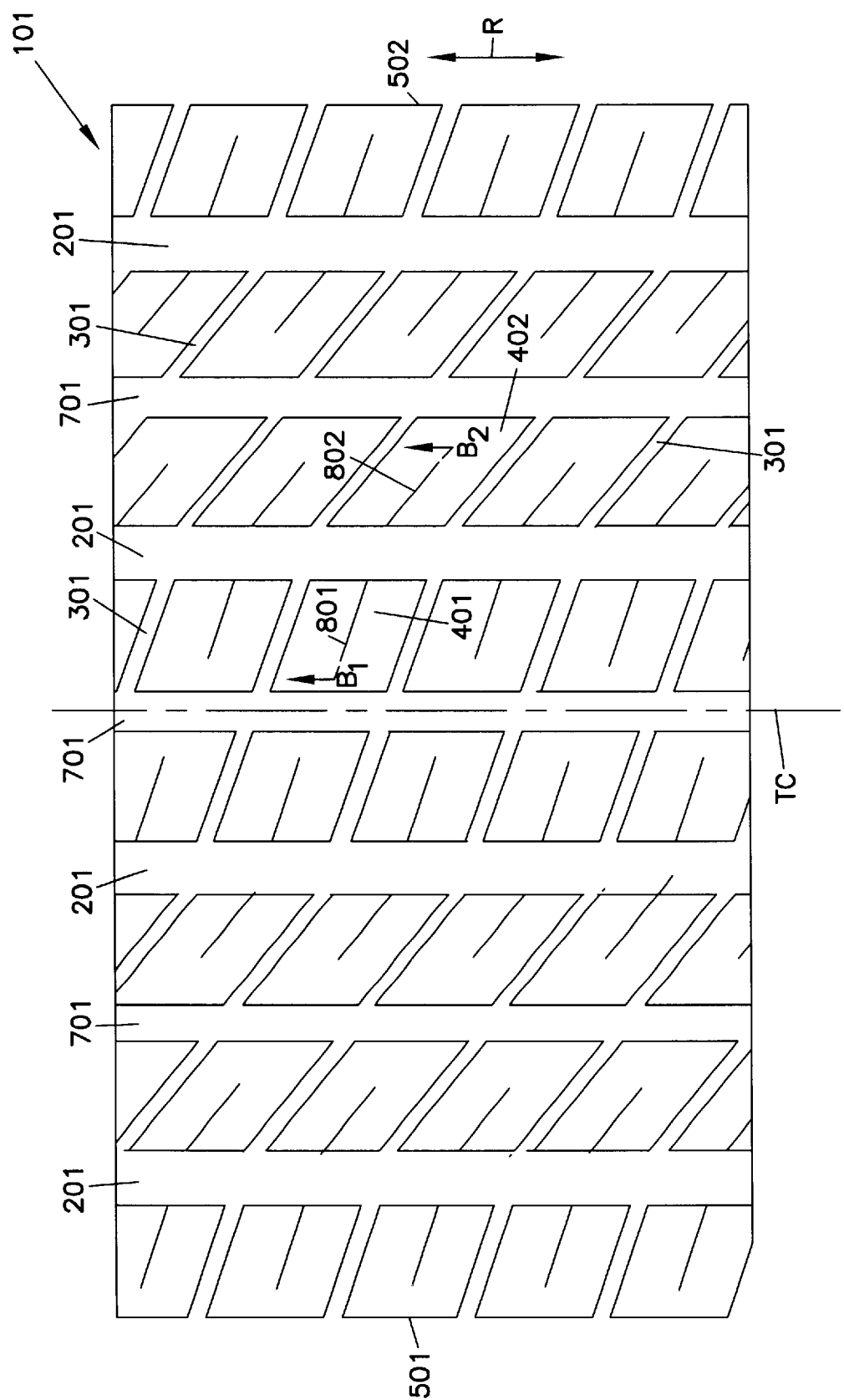
FIG. 4 is a view similar to FIG. 1, but showing the tread of a known pneumatic radial tire.
Figure 5:
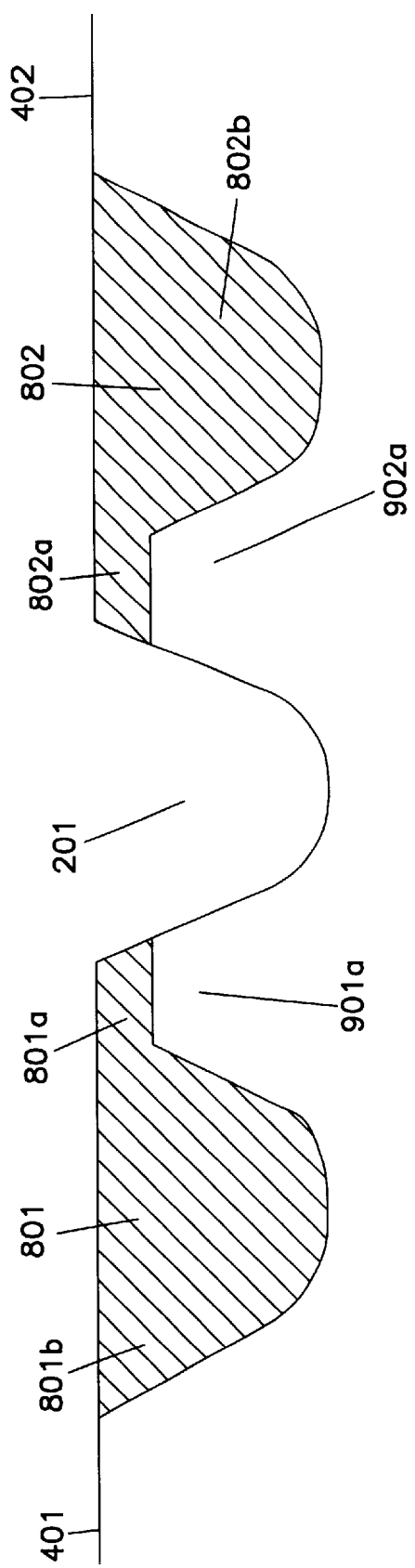
FIG. 5 is an enlarged schematic sectional view taken along the line $B_1-B_2$ of FIG. 4 and showing an OA type sipe.
Figure 6:
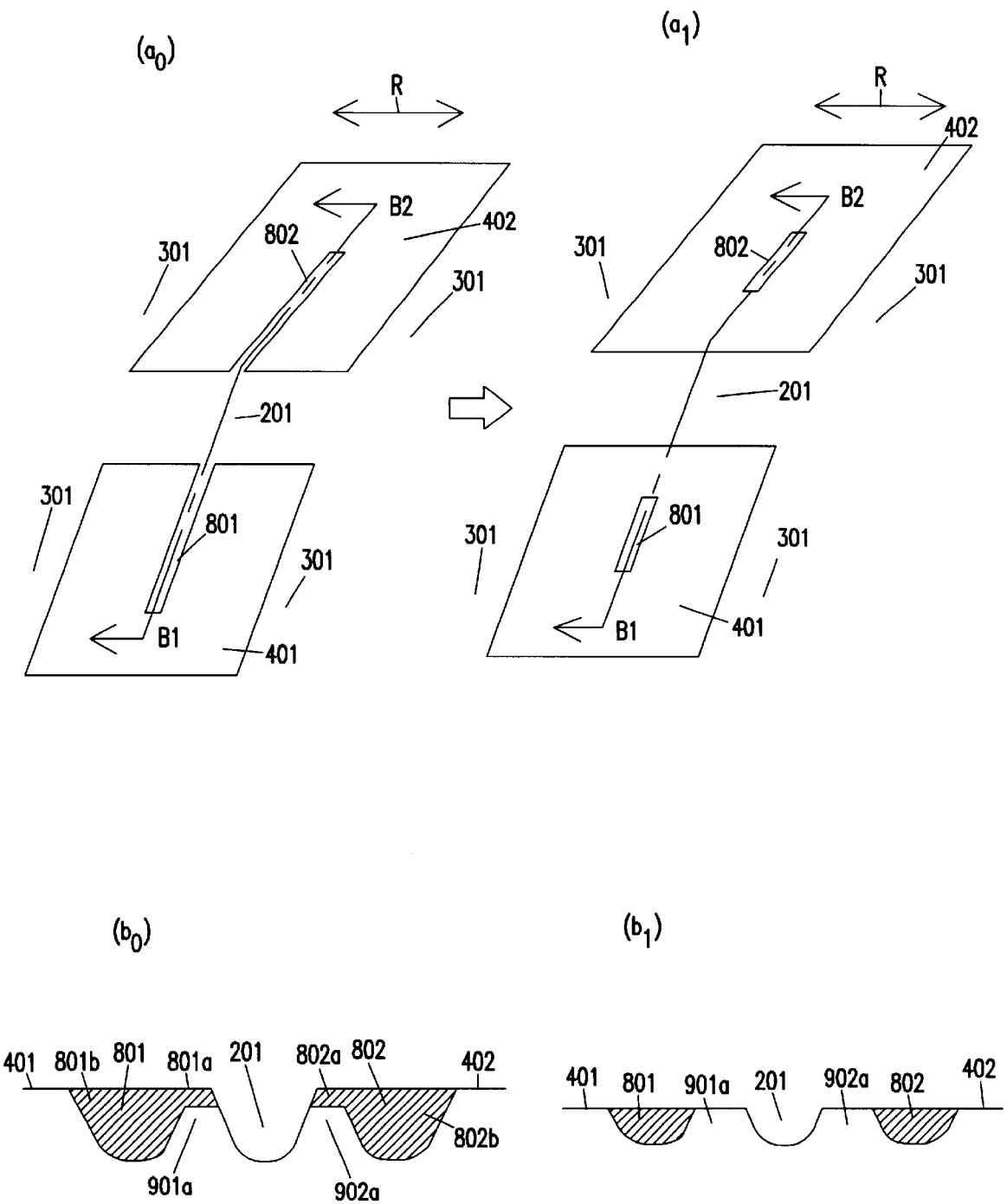
FIG. 6($a_0$) is a schematic top plan view of FIG. 5 showing the shape of the sipe as observed when the tire is new, or in the beginning stage of its wear.

Known OA type tires as described each having the tread pattern shown in FIG. 4 and the cross sectional shape of sipes shown in FIG. 5 were prepared as Comparative Example 1, and known OB type tires as described each having the tread pattern shown in FIG. 4 and the cross sectional shape of sipes shown in FIG. $7(b_0)$ were prepared as Comparative Example 2, and they were evaluated in the same way as the tires according to Example 1 of this invention. The OA type tires according to Comparative Example 1 were of the same design as those according to this invention except their sipes shaped in cross section as shown in FIG. 5, and not having any substantially U-shaped portion. The OB type tires according to Comparative Example 2 were of the same design as those according to this invention except their sipes shaped in cross section as shown in FIG. $7(b_0)$, and not having any portion of reduced depth extending over a shelf.

The evaluation of the tires for steering stability on a dry road, traction on a snow-covered road and resistance to wandering on a rainy road was made through a feeling test by two drivers riding in the vehicle having the tires set on its front and rear wheels. The results are shown in Table 1 by index numbers as compared with those of Comparative Example 1 shown as 100. A larger number indicates a better result.

The evaluation of the tires for resistance to uneven wear was made by determining a difference in the amount of wear on the blocks between the opposite sides of sipes after a running distance of 9,600 km had been covered by the vehicle having the tires set on its front and rear wheels, and obtaining the reciprocal of the value of the difference. The results are shown in Table 1 by index numbers as compared with that of Comparative Example 1 shown as 100. A larger number indicates a better result.

TABLE 1

| Evaluation | | Example 1 | Comparative Example 1 | Comparative Example 2 |
| --- | --- | --- | --- | --- |
| New tire | Steering stability on a dry road | 100 | 100 | 80 |
| | Traction on a snow-covered road | 105 | 100 | 120 |
| | Resistance to wandering on a rainy road | 103 | 100 | 105 |
| After loss of a half of the main groove depth | Steering stability on a dry road | 100 | 100 | 90 |
| | Traction on a snow-covered road | 110 | 100 | 115 |

TABLE 1-continued

| Evaluation | Example 1 | Comparative Example 1 | Comparative Example 2 |
| --- | --- | --- | --- |
| Resistance to wandering on a rainy road | 105 | 100 | 110 |
| Uneven wear (toe-and-heel wear) | 100 | 100 | 70 |

As is obvious from Table 1, the tires according to this invention showed an improved traction on a snow-covered road and an improved resistance to wandering on a rainy road, while not causing any lowering of steering stability on a dry road, both when they were new, and when they had been so worn as to lose a half of the main groove depth, as compared with those according to Comparative Example 1. They were comparable to the tires of Comparative Example 1 in resistance to uneven wear. They did not show any improved traction on a snow-covered road, or resistance to wandering on a rainy road over those of Comparative Example 2, but showed an improved steering stability on a dry road and an improved resistance to uneven wear.

These results confirm that the pneumatic tires of this invention exhibit an improved traction on a snow-covered road and an improved resistance to wandering on a rainy road, while retaining or improving the steering stability of the known tires on a dry road and their resistance to uneven wear, throughout their life.

Since the pneumatic radial tire of this invention is so designed as above-mentioned, it is useful even as an all-season tire for a heavy sport utility vehicle (SUV) without causing any reduction of steering stability on a dry road, or any toe-and-heel, or other uneven wear, while showing an improved traction on a snow-covered road and an improved resistance to wandering on a rainy road, throughout its life.

While the invention has been described in detail based on its preferred embodiment, it is to be understood that variations or modifications may be easily made by those skilled in the art without departing from the scope and spirit of this invention which are defined by the appended claims. It is also to be understood that the description of Japanese Patent Application No. 68858/2000 is incorporated herein by reference.

What is claimed is:

1. A pneumatic radial tire having blocks formed on its tread by transverse grooves extending along a width of the tire and main grooves extending circumferential 14 across the transverse grooves, wherein two of the blocks that are spaced apart from each other transversely by one of the main grooves have a sipe that extends transversely across said one of the main grooves from one of the two blocks to the other of the two blocks, the sipe being open throughout its length in a tread surface of each of said two blocks and said one of the main grooves, the sipe having along its length and depth a cross section defined by an inner portion made in each of the two blocks, a substantially U-shaped portion made in the bottom and side walls of said one of the main grooves, and a connecting portion made in each of the two blocks for connecting the inner and substantially U-shaped portions, said connecting portion having a depth that is reduced by a shelf formed on each of the two blocks and is smaller than a depth of the inner portion, said main grooves having a depth that is smaller than the depth of transverse grooves, but which is equal to the depth of said transverse grooves where the main grooves cross the transverse grooves.

2. A radial tire as set forth in claim 1, wherein $$D_1 - 1.6 \text{ mm} \leqq D_2$$

where $D_1$ is the depth of the transverse grooves and $D_2$ is the depth of the main grooves; and $$0.1 \times SD_1 \leqq SD_2 \leqq 0.5 \times SD_1$$

$$0.1 \times SD_1 \leqq SD_3 \leqq 0.3 \times SD_1$$

where $SD_1$ is the maximum depth of the inner portion, $SD_2$ is the depth of the connecting portion and $SD_3$ is the depth of the substantially U-shaped portion.

* * * * *